United States Patent [19]
Dodson

[11] Patent Number: 5,033,205
[45] Date of Patent: Jul. 23, 1991

[54] PROCESSES IN WHICH MATTER IS SUBJECTED TO FLUID FLOW

[75] Inventor: Christopher E. Dodson, Reading, England

[73] Assignee: Mortimer Technology Holdings Limited, Reading, England

[21] Appl. No.: 473,974

[22] PCT Filed: Oct. 18, 1988

[86] PCT No.: PCT/GB88/00887
§ 371 Date: Apr. 23, 1990
§ 102(e) Date: Apr. 23, 1990

[87] PCT Pub. No.: WO89/03968
PCT Pub. Date: May 5, 1989

[30] Foreign Application Priority Data
Oct. 23, 1987 [GB] United Kingdom ............... 8724873

[51] Int. Cl.$^5$ .............................................. F26B 3/08
[52] U.S. Cl. ........................................ 34/10; 34/57 A
[58] Field of Search ................ 34/57 R, 57 A, 57 B, 34/10; 432/58

[56] References Cited

U.S. PATENT DOCUMENTS

| | | |
|---|---|---|
| 3,527,575 | 9/1970 | Thompson . |
| 4,165,568 | 8/1979 | Gilbert et al. ................. 34/57 R |
| 4,736,895 | 4/1988 | Huttlin ............................ 34/57 R |
| 4,909,811 | 3/1990 | Dodson . |

FOREIGN PATENT DOCUMENTS

| | | |
|---|---|---|
| 0068853 | 1/1983 | European Pat. Off. . |
| 0077294 | 4/1983 | European Pat. Off. . |
| 479498 | 11/1969 | Switzerland . |

*Primary Examiner*—Henry A. Bennett
*Attorney, Agent, or Firm*—Watson, Cole, Grindle & Watson

[57] ABSTRACT

Apparatus is provided for subjecting matter to fluid flow. The apparatus comprises a chamber (10) having an annular fluid inlet (14) beneath a first annular region (22) in the chamber. A second annular region (24) is contiguous with and disposed outwardly of the region (22) between the region (22) and a circumferential wall (12), which has a slope (18) towards the annular inlet (14). Means shown as an annular array of radially extending slots provided in an annular wall portion (FIG. 3) direct fluid through the inlet (14) with vertical and circumferential flow components. In use matter in the chamber is moved in a band continuously along an annular path in the regions. (22, 24). The matter is moved vertically and circumferentially while in the region (22) by the flow therein, is moved out of this flow into region (24) by circumferential force and is directed back into the region (22) by the slope (18) as indicated by arrows (30). Thus the matter is not continuously subjected to the fluid flow while being moved in its annular path in the chamber (10).

31 Claims, 3 Drawing Sheets

PROCESSES IN WHICH MATTER IS SUBJECTED TO FLUID FLOW

BACKGROUND AND SUMMARY OF THE INVENTION

This invention relates to processes in which matter is subjected to fluid flow.

In our specification EP-B-68853 there is disclosed apparatus comprising a chamber having an annular fluid inlet disposed beneath an annular region in the chamber and means for directing fluid flow through the inlet into the annular region with vertical and circumferential flow components for moving a bed of matter in the chamber in a band along an annular path in the annular region as the fluid passes through the bed.

This apparatus may be used for treating the fluid and/or the matter as the fluid passes through the bed of matter. During the treatment of matter and/or fluid in this way, the matter is continuously in the flow of fluid as it moves along the annular path. In certain processes such continuous subjection of the matter to the fluid flow can be disadvantageous.

Accordingly, the present invention provides a process in which matter is subjected to fluid flow, comprising providing a flow of fluid in a first annular region having vertical and circumferential flow components, providing a second annular region contiguous with and disposed outwardly of the first region, moving matter in a band continuously around the regions while circulating matter in the band between the regions such that the matter moves into and out of the flow during movement around the regions.

In a preferred embodiment of the invention to be described hereinafter the matter is moved out of the first annular region by centrifugal force and is returned from the second annular region to the first annular region by a slope in a wall means bounding the second annular region.

The process of the invention is particularly, but not exclusively, applicable where there is a heat transfer between the matter and the fluid flow.

The invention also includes apparatus for subjecting matter to fluid flow, comprising a chamber having an annular fluid inlet means disposed beneath a first annular region in the chamber, the chamber having a second annular region contiguous with and disposed outwardly of the first region between the first region and a circumferential wall means of the chamber, means for directing fluid flow through the inlet into the first annular region with vertical and circumferential flow components, and means for moving matter which has moved out of the flow in the first region into the second region by centrifugal force back into the first region.

The invention also includes apparatus for subjecting matter to fluid flow comprising a chamber having a circumferential wall means extending upwardly and disposed radially outwardly, of an annular fluid inlet means, at least a portion of the wall means having a slope towards the annular fluid inlet means whereby the chamber has a first annular region above the annular fluid inlet means and a second annular region between the first region and the wall means, means for directing fluid through the inlet means into the first annular region with vertical and circumferential flow components such that, in use, matter in the chamber is moved in a band continuously along an annular path in the regions, the matter being moved vertically and circumferentially whilst in the first region by the flow therein, being moved out of the flow in the first region into the second region by centrifugal force and being directed back into the first region by the slope of the wall means.

The slope may extend downwardly to the outer edge of the annular fluid inlet means.

The circumferential wall means may comprise a cylindrical portion extending upwardly from a portion having the slope.

The chamber may include second circumferential wall means extending upwardly, and disposed radially inwardly, of the annular fluid inlet means.

This second circumferential wall means may comprise at least a portion having a slope toward the annular fluid inlet means, which slope may extend to the radially inner edge of the annular fluid inlet means.

The means for directing fluid through the inlet into the first annular region with vertical and circumferential flow components may comprise an annular array of at least generally radially extending elongate passage means, each of which has at least one side surface which is inclined such that flow upwardly through the passage means exits with a circumferential flow component.

These passage means may be provided in an annular wall portion, and for example each passage means may comprise a slot extending through the wall portion, both of the at least generally radially extending side surfaces of the slot being inclined circumferentially.

The annular array of passage means may be disposed beneath the annular fluid inlet means and the flow directing means may further comprise respective flow guiding means extending upwardly between the array and locations at or adjacent radially inner and outer edges of the annular inlet means for causing flow through the array to be confined substantially to the first region in the chamber.

One or each of the flow guiding means may comprise aperture means for directing fluid flow into the flow through the array. Preferably the one or each flow guiding means comprises a circumferential wall portion provided with the aperture means. These aperture means may comprise circumferentially spaced apart elongate apertures, each having at least one side surface which is inclined such that flow therethrough exits with a circumferential flow component. Preferably these elongate apertures extend upwardly.

In order that the invention may be better understood, an embodiment thereof, which is given by way of example only, will now be described with reference to the accompanying drawings.

DETAILED DESCRIPTION OF THE PREFERRED EMBODIMENT

Figure 1:
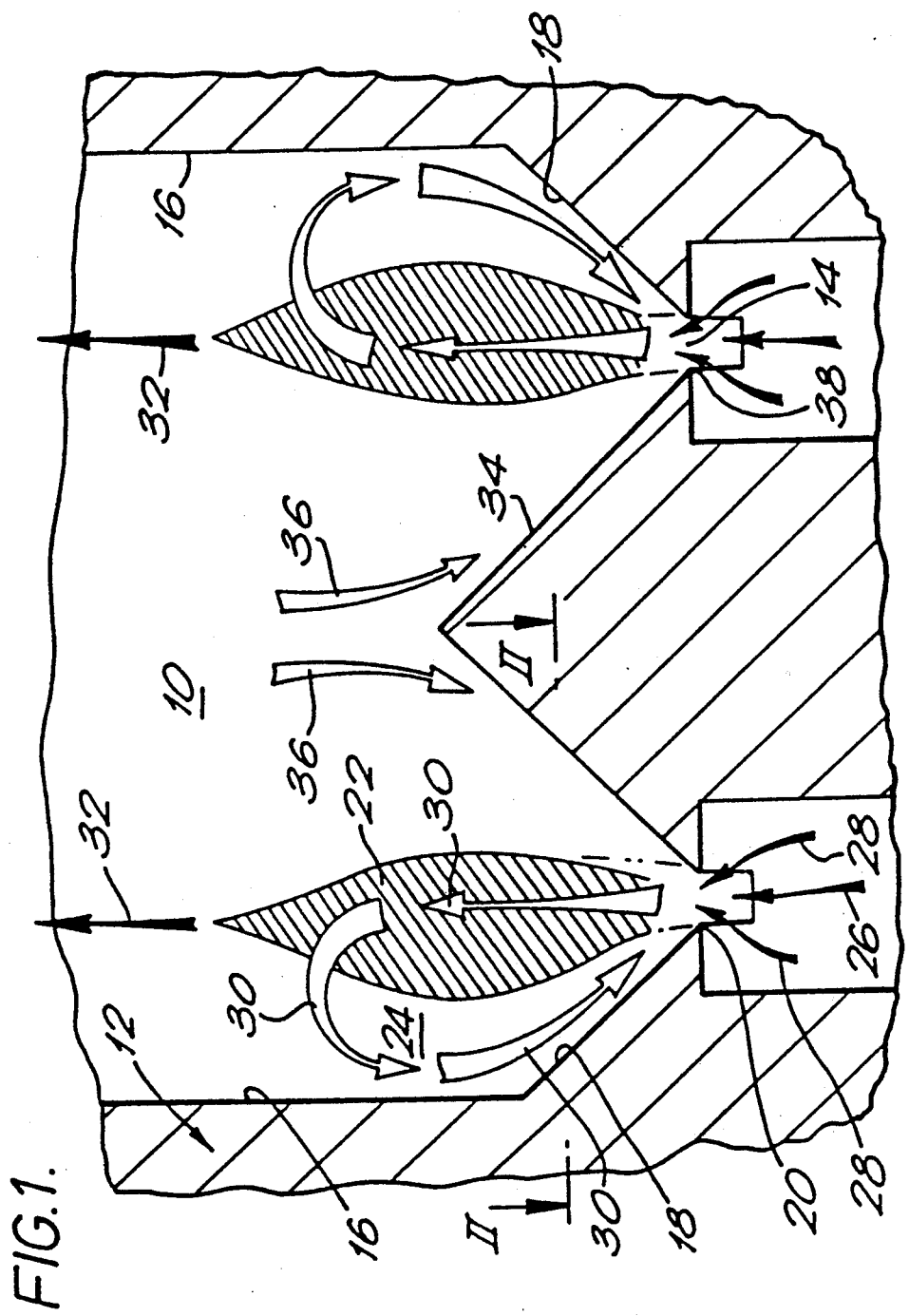
FIG. 1 is a schematic axial cross-section of part of an apparatus for subjecting matter to fluid flow.
Figure 2:
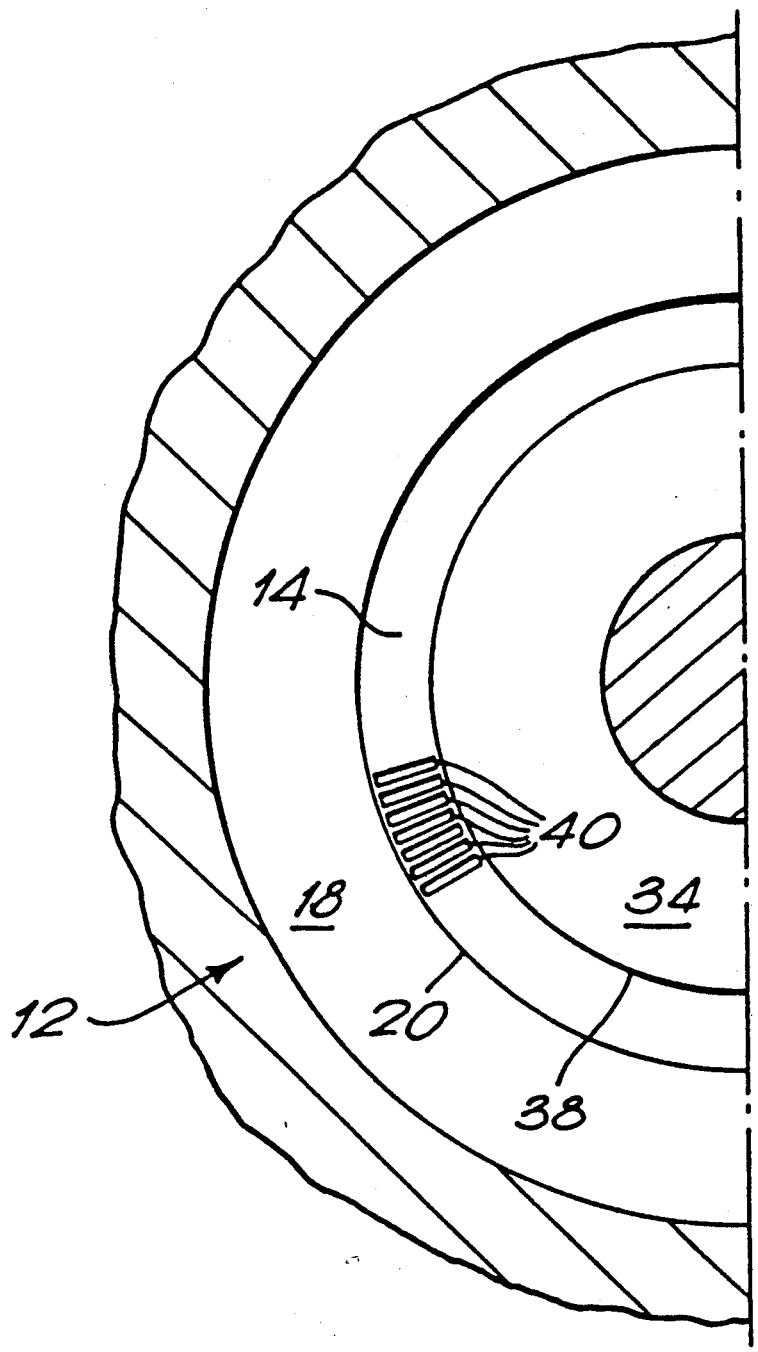
FIG. 2 is a cross-section along the line II—II of FIG. 1.

Referring first to FIGS. 1 and 2, the illustrated apparatus comprises a chamber 10 having a circumferential wall 12 which is disposed radially outwardly of an annular fluid inlet 14. The wall 12 slopes towards the annular fluid inlet, and as shown comprises a cylindrical portion 16 extending upwardly from a sloping portion 18. In the illustrated apparatus, the sloping portion 18 extends downwardly to the outer edge 20 of the annular fluid inlet.

Within the chamber 10 there is a first annular region disposed above the annular fluid inlet and designated 22 in FIG. 1 and a second annular region 24 contiguous with the first annular region and disposed between that region and the circumferential wall 12. The second region is disposed above the sloping portion 18 of the wall in the embodiment.

Figure 3:
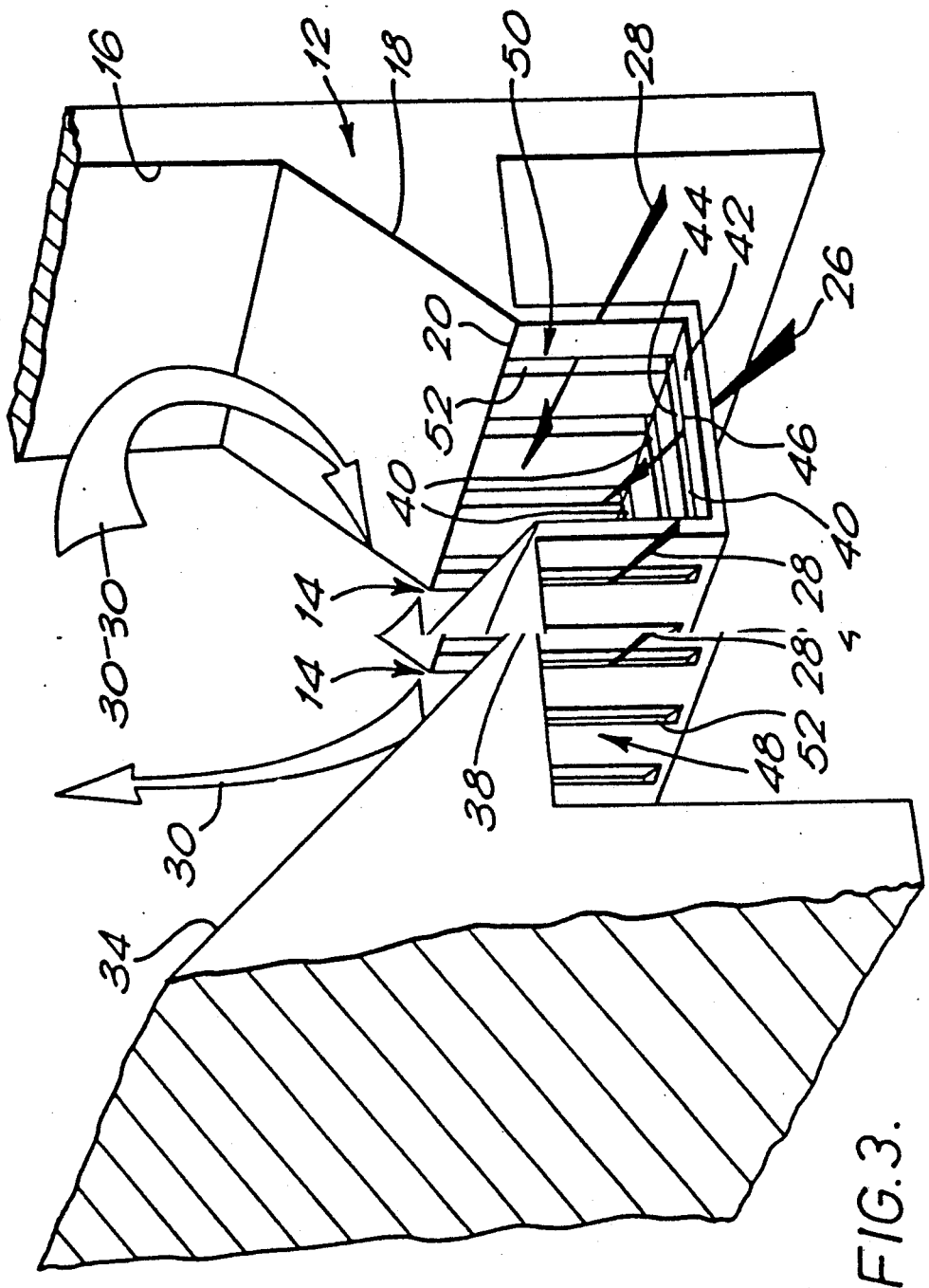
FIG. 3 is a perspective view of a radial portion of the apparatus.

The apparatus also includes means for directing fluid through the annular inlet 14 with vertical and circumferential flow components. The direction of the fluid flow through the inlet is indicated in FIG. 1 and FIG. 3 by arrows 26 and 28. The flow of fluid through the inlet is such that it will move matter in the chamber 10 in a band continuously along an annular path in the regions 22, 24. This matter is moved vertically and circumferentially whilst in the first region 22 by the flow of fluid therein, is moved out of this flow of fluid in the first region into the second region by circumferential force and is directed back into the first region by the slope 18. The movement of the matter into and out of the flow of fluid is indicated by arrows 30 in FIGS. 1 and 3. It will be understood that whilst the matter is being circulated as indicated by arrows 30 it is also moving in the circumferential direction. Furthermore, it will be understood that when the matter moves into the outer annular region 24 it is not subjected therein to the flow of the fluid and falls under gravity towards the annular inlet 14 whereupon it re-enters the fluid flow and is moved circumferentially and vertically by the fluid flow therein.

The fluid exits the chamber 10 upwardly as indicated by arrows 32 after it has passed through the annular region 22.

In the illustrated apparatus the chamber 10 includes a second circumferential wall 34 extending upwardly and disposed radially inwardly of the annular fluid inlet 14. This circumferential wall 34 has a slope towards the annular fluid inlet such that matter introduced centrally into the chamber as indicated by arrows 36 will be directed into the first annular region 22 above the annular fluid inlet 14. Whilst the whole of the second circumferential wall is provided with such a slope in the embodiment and this slope extends to the radially inner edge 38 of the annular fluid inlet 14, it is to be understood that only a portion of the circumferential wall 34 need be provided with such a slope and that slope need not extend to the edge 38.

Referring now particularly to FIG. 3, the means for directing fluid through the annular inlet 14 with vertical and circumferential flow components in the illustrated apparatus comprises an annular array of at least generally radially extending elongate passages 40. A portion of the annular array of passages is illustrated in FIG. 2, however it is to be understood that the array extends completely around the annular inlet 14. Each passage 40 has at least one side surface which is inclined such that flow upwardly through the passage will exit with a circumferential flow component. In the illustrated apparatus the passages 40 are provided in an annular wall portion 42 and each passage comprises a slot extending through the wall portion, with both of the at least generally radially extending side surfaces 44, 46 of each slot being inclined in the circumferential direction. As shown the slots 40 and their side surfaces 44, 46 extend radially.

In order to cause the flow through the array of slots 40 to be confined substantially to the annular region above the fluid inlet 14, the flow directing means further comprises respective flow guiding means, generally indicated at 48 and 50 in FIG. 3, extending upwardly between the array of slots 40 and locations at or adjacent the radially inner and outer edges 38, 20 of the annular inlet 14.

In the illustrated apparatus each flow guiding means 48, 50 comprises aperture means for directing fluid flow into the flow through the array of slots 40. In FIGS. 1 and 3, the flow through the array is indicated by arrows 26 whilst the flow through the guiding means is indicated by arrows 28. It will be appreciated that the flow through the guiding means 48 has a radially outwardly as well as a circumferential component and the flow through the guiding means 50 has a radially inwardly as well as a circumferential flow component. Accordingly the respective flows through the guiding means 48 and 50 confine the flow through the array of slots 40 substantially to the annular region above the slots 40 and prevent the flow contacting the edges 20, 38 of the annular inlet 14.

The flow guiding means 48, 50 each comprises a circumferential wall portion provided with apertures 52 which are circumferentially spaced apart elongate apertures, having at least one side surface which is inclined such that the flow therethrough exits with a circumferential flow component as well as a radial flow component. In the illustrated apparatus the elongate apertures extend upwardly from the ends of slots 40.

The illustrated apparatus is particularly applicable for use in heating matter comprising a particulate material which has to be heated to a predetermined temperature, but which is adversely affected by being continuously subjected to temperatures above that predetermined temperature during treatment.

In such an application a flow of heated fluid is provided to the first annular region 22 in the chamber 10 with vertical and circumferential components by virtue of its passage through the slots 40 and the apertures 52. The particulate matter to be heated is supplied to the chamber centrally thereof and is fed to the region 22 by the slope of the inner circumferential wall 34. This particulate material is then moved in a band continuously along an annular path in the regions 22 and 24. The particulate material is moved vertically and circumferentially by the fluid flow whilst in the first region, is moved out of the flow in the first region into the second region by circumferential force and is thereafter directed back into the first region by the slope 18 of the outer circumferential wall 12. Thus, the particulate material is moved in a band continuously around the regions 22, 24 whilst being circulated in this band between the regions such that the material moves into and out of the heated flow during movement around the regions. The fluid may be heated prior to and/or subsequent to its passage through the inlet 14. For example the fluid may comprise combustion gases, the combustion region of which is totally below the annular inlet 14, is totally above the annular 14 or which spans the annular inlet 14.

It will be understood that alternative means to the provision of a slope such as slope 18, on the outer cirumfential wall 16 may be provided for moving matter from annular region 24 back into annular region 22. For example, it is envisaged that such alternative means may comprise a plurality of fluid jets disposed around the outer circumferential wall and directed inwardly with at least a radial flow component for this purpose.

I claim:

1. A process in which matter is subjected to fluid flow, comprising providing a flow of fluid in a first annular region having vertical and circumferential flow components, providing a second annular region contiguous with and disposed outwardly of said first region, moving matter in a band continuously around said regions while circulating matter in said band between said regions such that said matter moves into and out of said flow during movement around said regions, and wherein said matter is moved out of said flow in said first annular region by centrifugal force.

2. A process as claimed in claim 1, wherein matter is returned from said second annular region to said first annular region by a slope in a wall means bounding said second annular region.

3. A method as claimed in claim 1, wherein there is a heat transfer between said matter and fluid flow.

4. Apparatus for subjecting matter to fluid flow, comprising a chamber having an annular fluid inlet means disposed beneath a first annular region in the chamber, the chamber having a second annular region contiguous with and disposed outwardly of the first region between said first region and a circumferential wall means of the chamber, means for directing fluid flow through said inlet into said first annular region with vertical and circumferential flow components, and means for moving matter which has moved out of the flow in said first region into said second region by centrifugal force back into said first region, said means for directing fluid through said inlet into said first annular region with vertical and circumferential flow components comprising an annular array of at least generally radially-extending elongate passage means, each of which has at least one side surface which is inclined such that flow upwardly through said passage means exits with a circumferential flow component.

5. Apparatus for subjecting matter to fluid flow comprising a chamber having a circumferential wall means extending upwardly, and disposed radially outwardly, of an annular fluid inlet means, at least a portion of said wall means having a slope towards said annular fluid inlet means whereby said chamber has a first annular region above said annular fluid inlet means and a second annular region between said first region and said wall means, means for directing fluid through said inlet means into said first annular region with vertical and circumferential flow components such that, in use, matter in said chamber is moved in a band continuously along an annular path in said regions, the matter being moved vertically and circumferentially whilst in said first region by the flow therein, being moved out of said flow in said first region into said second region by centrifugal force and being directed back into said first region by the slope of said wall means, said means for directing fluid through said inlet into said first annular region with vertical and circumferential flow components comprising an annular array of at least generally radially-extending elongate passage means, each of which has at least one side surface which is inclined such that flow upwardly through said passage means exits with a circumferential flow component.

6. Apparatus as claimed in claim 5, wherein said slope extends downwardly to the outer edge of said annular fluid inlet means.

7. Apparatus as claimed in claim 5, wherein said circumferential wall means comprises a cylindrical portion extending upwardly from a portion having said slope.

8. Apparatus as claimed in claim 5, wherein said chamber includes second circumferential wall means extending upwardly, and disposed radially inwardly, of said annular fluid inlet means.

9. Apparatus as claimed in claim 8, wherein said second circumferential wall means comprises at least a portion having a slope towards said annular fluid inlet means.

10. Apparatus as claimed in claim 9, wherein said slope extends to the radially inner edge of said annular fluid inlet means.

11. Apparatus as claimed in claim 5, wherein said passage means are provided in an annular wall portion.

12. Apparatus as claimed in claim 11, wherein each passage means comprises a slot extending through said wall portion, both of the at least generally radially extending side surfaces of the slot being inclined circumferentially.

13. Apparatus as claimed in claim 5, wherein said annular array of passage means is disposed beneath said annular fluid inlet means and said flow directing means further comprises respective flow guiding means extending upwardly between said array and locations at or adjacent radially inner and outer edges of said annular inlet means for causing flow through said array to be confined substantially to said first region in the chamber.

14. Apparatus as claimed in claim 13, wherein one or each of said flow guiding means comprises aperture means for directing fluid flow into the flow through said array.

15. Apparatus as claimed in claim 14, wherein said one or each flow guiding means comprises a circumferential wall portion provided with said aperture means.

16. Apparatus as claimed in claim 14, wherein said aperture means comprise circumferentially spaced apart elongate apertures.

17. Apparatus as claimed in claim 16, wherein said apertures each have at least one side surface which is inclined such that flow therethrough exits with a circumferential flow component.

18. Apparatus as claimed in claim 16, wherein said elongate apertures extend upwardly.

19. Apparatus as claimed in claim 4, wherein said chamber includes second circumferential wall means extending upwardly, and disposed radially inwardly, of said annular fluid inlet means.

20. Apparatus as claimed in claim 19, wherein said second circumferential wall means comprises at least a portion having a slope towards said annular fluid inlet means.

21. Apparatus as claimed in claim 20, wherein said slope extends to the radially inner edge of said annular fluid inlet means.

22. Apparatus as claimed in claim 4, wherein said passage means are provided in an annular wall portion.

23. Apparatus as claimed in claim 22, wherein each passage means comprises a slot extending through said wall portion, both of the at least generally radially extending side surfaces of the slot being inclined circumferentially.

24. Apparatus as claimed in claim 4, wherein said annular array of passage means is disposed beneath said annular fluid inlet means and said flow directing means further comprises respective flow guiding means extending upwardly between said array and locations at or adjacent radially inner and outer edges of said annular inlet means for causing flow through said array to be confined substantially to said first region in the chamber.

25. Apparatus as claimed in claim 24, wherein one or each of said flow guiding means comprises aperture means for directing fluid flow into the flow through said array.

26. Apparatus as claimed in claim 25, wherein said one or each flow guiding means comprises a circumferential wall portion provided with said aperture means.

27. Apparatus as claimed in claim 25, wherein said aperture means comprise circumferentially spaced apart elongate apertures.

28. Apparatus as claimed in claim 27, wherein said apertures each have at least one side surface which is inclined such that flow therethrough exits with a circumferential flow component.

29. Apparatus as claimed in claim 27, wherein said elongate apertures extend upwardly.

30. Apparatus for subjecting matter to fluid flow, comprising a chamber having an annular fluid inlet means disposed beneath a first annular region in the chamber, the chamber having a second annular region contiguous with and disposed outwardly of the first region between said first region and a circumferential wall means of the chamber, means for directing fluid flow through said inlet into said first annular region with vertical and circumferential flow components, and means for moving matter which has moved out of the flow in said first region into said second region by centrifugal force back into said first region, said fluid flow directing means including flow guiding means for causing fluid flow through said inlet to be confined substantially to said first annular region.

31. Apparatus for subjecting matter to fluid flow comprising a chamber having a circumferential wall means extending upwardly, and disposed radially outwardly, of an annular fluid inlet means, at least a portion of said wall means having a slope towards said annular fluid inlet means whereby said chamber has a first annular region above said annular fluid inlet means and a second annular region between said first region and said wall means, means for directing fluid through said inlet means into said first annular region with vertical and circumferential flow components such that, in use, matter in said chamber is moved in a band continuously along an annular path in said regions, the matter being moved vertically and circumferentially whilst in said first region by the flow therein, being moved out of said flow in said first region into said second region by centrifugal force and being directed back into said first region by the slope of said wall means, said fluid flow directing means including flow guiding means for causing fluid flow through said inlet to be confined substantially to said first annular region.

* * * * *